(12) United States Patent
Line et al.

(10) Patent No.: US 10,473,136 B2
(45) Date of Patent: Nov. 12, 2019

(54) VEHICLE SEATING CUSHION WITH SNAP-FIT FASTENERS TO INTERCONNECT WITH SNAP-FIT RECEIVERS ON A STRUCTURAL SUPPORT

(71) Applicant: Ford Global Technologies, LLC, Dearborn, MI (US)

(72) Inventors: Johnathan Andrew Line, Northville, MI (US); Christian J. Hosbach, Taylor, MI (US); Corbin Shea Johnston, Winnipeg (CA); Spencer Robert Hoernke, Dundas (CA); Kevin Mozurkewich, Livonia, MI (US); Andrew Matusko, Dexter, MI (US); Brian M. Thiel, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 15/605,238

(22) Filed: May 25, 2017

(65) Prior Publication Data
US 2018/0340563 A1  Nov. 29, 2018

(51) Int. Cl.
| | | |
|---|---|---|
| F16M 7/00 | (2006.01) |
| F16B 21/08 | (2006.01) |
| B60N 2/64 | (2006.01) |
| F16B 2/22 | (2006.01) |
| B60N 2/68 | (2006.01) |
| B60N 2/70 | (2006.01) |

(52) U.S. Cl.
CPC .............. *F16B 21/088* (2013.01); *B60N 2/64* (2013.01); *B60N 2/682* (2013.01); *B60N 2/70* (2013.01); *F16B 2/22* (2013.01)

(58) Field of Classification Search
CPC .. B60N 2/64; B60N 2/682; B60N 2/70; F16B 2/22; F16B 21/088
See application file for complete search history.

(56) References Cited

U.S. PATENT DOCUMENTS

| | | | | |
|---|---|---|---|---|
| 3,630,572 A | * | 12/1971 | Homier .................... | A47C 7/18 297/218.1 |
| 3,861,747 A | * | 1/1975 | Diamond ................ | A47C 7/024 297/452.14 |
| 4,579,389 A | * | 4/1986 | Shimbori ................. | A47C 7/18 297/452.6 |

(Continued)

*Primary Examiner* — James M Ference
(74) *Attorney, Agent, or Firm* — Vichit Chea; Price Heneveld LLP

(57) ABSTRACT

A seating assembly for a vehicle comprises: a cushion comprising an outer edge and a plurality of snap-fit-fasteners; and a carrier comprising an outer edge surface and a plurality of snap-fit receivers near the outer edge surface of the carrier arranged to receive the plurality of snap-fit fasteners; wherein the plurality of snap-fit receivers have received and are retaining the plurality of snap-fit fasteners such that the cushion is interconnected with the carrier; and wherein the plurality of snap-fit fasteners and plurality of receivers are arranged to prevent the edge of the cushion from rolling up. The cushion further comprises a lip having an inward facing surface; wherein the cushion at least partially surrounds the carrier with at least a portion of the inward facing surface of the lip facing the outer edge surface of the carrier.

6 Claims, 19 Drawing Sheets

(56) References Cited

U.S. PATENT DOCUMENTS

| | | | | |
|---|---|---|---|---|
| 4,606,580 A * | 8/1986 | Yoshizawa | B60N 2/5825 | 297/452.6 |
| 4,643,480 A * | 2/1987 | Morita | B60N 2/70 | 297/226 |
| 4,865,383 A * | 9/1989 | Sbaragli | B60N 2/5825 | 297/218.2 |
| 5,401,075 A * | 3/1995 | Venuto | A47C 31/023 | 297/218.2 |
| 5,605,373 A * | 2/1997 | Wildern, IV | B60N 2/5825 | 297/218.3 |
| 5,733,001 A * | 3/1998 | Roberts | B60N 2/5825 | 24/297 |
| 5,820,213 A * | 10/1998 | Severinski | A47C 31/023 | 297/218.5 |
| 5,826,312 A * | 10/1998 | Schroder | B60N 2/5825 | 24/601.2 |
| 6,220,661 B1 * | 4/2001 | Peterson | A47C 7/24 | 297/218.4 |
| 6,241,188 B1 * | 6/2001 | Simpson | B60N 2/6027 | 244/122 R |
| 6,394,546 B1 * | 5/2002 | Knoblock | A47C 1/023 | 297/284.4 |
| 6,425,637 B1 * | 7/2002 | Peterson | A47C 7/24 | 297/452.3 |
| 6,499,801 B1 * | 12/2002 | Peterson | A47C 31/001 | 297/219.1 |
| 6,726,278 B1 * | 4/2004 | Albright | A47C 3/18 | 297/218.1 |
| 6,964,453 B1 * | 11/2005 | Flegal | B60N 2/5825 | 297/452.6 |
| 7,287,305 B2 * | 10/2007 | Bednarski | B60N 2/5825 | 24/297 |
| 7,419,221 B2 * | 9/2008 | Fisher | A47C 3/00 | 297/440.2 |
| 7,481,489 B2 * | 1/2009 | Demick | B60N 2/5825 | 297/218.1 |
| 7,490,392 B2 * | 2/2009 | Peterson | A47C 7/185 | 29/446 |
| 7,490,395 B2 * | 2/2009 | Coffield | A47C 31/026 | 29/432 |
| 7,585,025 B2 * | 9/2009 | Welch | B60N 2/80 | 297/218.2 |
| 7,891,735 B2 * | 2/2011 | Oku | B60N 2/6009 | 297/218.3 |
| 7,901,002 B2 * | 3/2011 | Mashimo | B60N 2/5825 | 297/218.3 |
| 7,946,649 B2 | 5/2011 | Galbreath et al. | | |
| 8,157,324 B2 * | 4/2012 | Matsuzaki | B60N 2/5816 | 297/218.1 |
| 8,696,066 B2 * | 4/2014 | Mizobata | B60N 2/682 | 297/440.11 |
| 8,973,990 B2 * | 3/2015 | Krupiczewicz | A47C 31/02 | 297/218.1 |
| 8,979,195 B2 * | 3/2015 | Itakura | B60N 2/6027 | 297/218.2 |
| 9,180,804 B2 * | 11/2015 | Tsunoda | B60N 2/5825 | |
| 9,555,728 B2 * | 1/2017 | Galbreath | A01K 1/0272 | |
| 2002/0050734 A1 * | 5/2002 | Takezawa | B60N 2/5825 | 297/452.58 |
| 2002/0074845 A1 * | 6/2002 | Perske | B60N 2/5825 | 297/452.6 |
| 2002/0101109 A1 * | 8/2002 | Stiller | B60N 2/5825 | 297/452.6 |
| 2002/0117882 A1 * | 8/2002 | Takezawa | B60N 2/5825 | 297/218.1 |
| 2003/0001421 A1 * | 1/2003 | Schmidt | B60N 2/5825 | 297/452.6 |
| 2003/0042773 A1 * | 3/2003 | Stiller | A47C 31/026 | 297/218.3 |
| 2005/0150090 A1 * | 7/2005 | Pedde | B60N 2/5825 | 24/698.1 |
| 2006/0214485 A1 * | 9/2006 | Brockschnieder | B60N 2/5816 | 297/228.11 |
| 2006/0237986 A1 * | 10/2006 | Brockschneider | B60N 2/5825 | 296/65.09 |
| 2007/0011853 A1 * | 1/2007 | Smith | B60N 2/5825 | 24/545 |
| 2007/0069559 A1 * | 3/2007 | Poulakis | B60N 2/5825 | 297/218.2 |
| 2008/0258523 A1 * | 10/2008 | Santin | B60N 2/5825 | 297/218.2 |
| 2009/0033131 A1 * | 2/2009 | Clauser | B60N 2/5825 | 297/218.4 |
| 2009/0064471 A1 * | 3/2009 | Santin | A47C 31/023 | 24/581.11 |
| 2009/0085384 A1 * | 4/2009 | Galbreath | B60N 2/5825 | 297/218.1 |
| 2009/0102270 A1 * | 4/2009 | Wissner | B60N 2/68 | 297/452.56 |
| 2014/0203603 A1 * | 7/2014 | Line | B60N 2/64 | 297/218.1 |
| 2015/0145303 A1 * | 5/2015 | Line | B60N 2/643 | 297/283.3 |
| 2016/0068089 A1 * | 3/2016 | Huebner | B60N 2/60 | 297/228.13 |
| 2016/0096448 A1 * | 4/2016 | Line | B60N 2/2222 | 297/354.11 |
| 2016/0096449 A1 * | 4/2016 | Line | B60N 2/2222 | 297/354.11 |
| 2016/0096450 A1 * | 4/2016 | Kondrad | B60N 2/7094 | 297/285 |
| 2016/0207433 A1 * | 7/2016 | Kondrad | B60N 2/02 | |
| 2016/0311367 A1 * | 10/2016 | Line | B60Q 3/233 | |
| 2016/0347224 A1 * | 12/2016 | Line | B60N 2/80 | |
| 2017/0203709 A1 * | 7/2017 | Line | B60N 2/6009 | |
| 2017/0355290 A1 * | 12/2017 | Line | B60N 2/5621 | |
| 2017/0355291 A1 * | 12/2017 | Line | B60N 2/68 | |
| 2017/0355292 A1 * | 12/2017 | Line | B60N 2/68 | |
| 2018/0340563 A1 * | 11/2018 | Line | B60N 2/682 | |

\* cited by examiner

US 10,473,136 B2

VEHICLE SEATING CUSHION WITH SNAP-FIT FASTENERS TO INTERCONNECT WITH SNAP-FIT RECEIVERS ON A STRUCTURAL SUPPORT

FIELD OF THE INVENTION

The present invention generally relates to the attachment of cushions onto a structural support for use as part of a vehicle seating assembly.

BACKGROUND OF THE INVENTION

A novel vehicle seating assembly utilizing a seatback including a carrier and a cushion assembly attached to the carrier was disclosed in U.S. patent application Ser. No. 15/414,659 (now U.S. Pat. No. 10,166,895), filed on Jan. 25, 2017, the entire disclosure of which is hereby incorporated by reference. The carrier provides structural support for the cushion assembly.

SUMMARY OF THE INVENTION

According to a first aspect of the present invention, a cushion for a seating assembly of a vehicle comprises: an outer edge; and a plurality of snap-fit fasteners arranged to interconnect with a plurality of snap-fit receivers on a structural support, so as to prevent the outer edge from rolling up.

Embodiments of the first aspect of the invention can include any one or a combination of the following features:
- The cushion further comprises: an occupant facing surface and a carrier facing surface opposite the occupant facing surface; wherein the plurality of snap-fit fasteners are accessible for interconnection from the carrier facing surface;
- Each of the plurality of snap-fit fasteners comprise a first cantilever, the first cantilever including a catch flange;
- Each of the plurality of snap-fit fasteners further include a second cantilever parallel to the first cantilever, and a base perpendicular to the first cantilever and the second cantilever; the second cantilever includes a catch flange extending toward the first cantilever; and the base, the first cantilever, and the second cantilever form a receiver channel; wherein the catch flange of the first cantilever extends toward the second cantilever;
- The cushion further comprises: a lip along the outer edge configured to at least partially surround an outer edge surface of the structural support; wherein at least a portion of the snap-fit fasteners are accessible for interconnection adjacent the lip;
- The base of the plurality of snap-fit fasteners further comprise a first wing portion and a second wing portion opposite the first wing portion; wherein at least part of the first wing portion and the second wing portion are disposed beneath the carrier facing surface; and
- The cushion comprises a recess in the carrier facing surface adjacent and parallel to the lip; wherein the receiver channels of at least some of the plurality of snap-fit fasteners are within the recess.

According to a second aspect of the present invention, a carrier for a seating assembly of a vehicle comprises: an outer edge surface; and a plurality of snap-fit receivers near the outer edge surface arranged to receive a plurality of snap-fit fasteners positioned on a cushion.

Embodiments of the second aspect of the invention can include any one or a combination of the following features:
- The plurality of snap-fit receivers each comprise a first catch receiving surface configured to support a first catch flange extending from a first cantilever of a snap-fit fastener of the plurality of snap-fit fasteners and thereby interconnect the cushion and the carrier;
- The plurality of snap-fit receivers each further comprises a second catch receiving surface configured to support a second catch flange extending from a second cantilever of the snap-fit fastener of the plurality of snap-fit fasteners;
- The plurality of snap-fit receivers each further comprise: a crest having a tangent line; and a cross-section width parallel to the tangent line of the crest that widens between the crest and the first catch receiving surface;
- The carrier further comprises: a generally forward projecting rib contiguous with the outer edge surface; wherein at least a portion of the plurality of snap-fit receivers are contiguous with the rib;
- The plurality of snap-fit receivers further comprise an elongated beam having a length, and the length of the elongated beam is generally parallel to the portion of the outer edge surface to which the length is closest; and
- The carrier further comprises a midline; wherein at least one of the plurality of snap-fit receivers is located at the midline; wherein at least three of the plurality of snap-fit receivers are located to one side of the midline; and wherein at least three of the plurality of snap-fit receivers are located to the an opposite side of the midline.

According to a third aspect of the present invention, a seating assembly for a vehicle comprises: a cushion comprising an outer edge and a plurality of snap-fit-fasteners; and a carrier comprising an outer edge surface and a plurality of snap-fit receivers near the outer edge surface of the carrier arranged to receive the plurality of snap-fit fasteners; wherein the plurality of snap-fit receivers have received and are retaining the plurality of snap-fit fasteners such that the cushion is interconnected with the carrier; and wherein the plurality of snap-fit fasteners and plurality of receivers are arranged to prevent the edge of the cushion from rolling up.

Embodiments of the third aspect of the invention can include any one or a combination of the following features:
- The cushion further comprises a lip having an inward facing surface; wherein the cushion at least partially surrounds the carrier with at least a portion of the inward facing surface of the lip facing the outer edge surface of the carrier;
- The cushion further comprises an occupant facing surface and carrier facing surface opposite the occupant facing surface; wherein the plurality of snap-fit fasteners interconnect with the plurality of snap-fit receivers from the carrier facing surface; and wherein at least a portion of the plurality of snap-fit fasteners interconnect with at least a portion of the plurality of snap-fit receivers adjacent the lip;
- The cushion further comprises a recess in the carrier facing surface adjacent and parallel to the lip; each of the plurality of snap-fit fasteners comprise a first cantilever, the first cantilever including a catch flange and a receiver facing surface that faces one of the plurality of receivers; the carrier further comprises a generally forward projecting rib contiguous with the outer edge surface; and each of the plurality of snap-fit receivers comprise a cantilever deforming surface and a first catch receiving surface; wherein at least a portion of the rib of the carrier is seated within the recess of the cushion; wherein the receiver facing surface is generally parallel to the portion of the outer edge of the cushion to which the receiver facing surface is closest; wherein least a portion of the plurality of the snap-fit receivers are arranged along the rib; wherein the cantilever deforming surface deforms the first cantilever of each of the plurality of snap-fit fasteners while the plurality of receivers receives the plurality of snap-fit fasteners until the catch flange snaps over and settles adjacent to the first catch receiving surface of the snap-fit receiver;

Each of the plurality of snap-fit fasteners further include a second cantilever parallel to the first cantilever, and a base perpendicular to the first cantilever and the second cantilever; the second cantilever includes a catch flange extending toward the first cantilever; and the base, the first cantilever, and the second cantilever form a receiver channel; wherein the catch flange of the first cantilever extends toward the second cantilever; and wherein the each of the plurality of receivers are disposed within the receiver channel of a snap-fit fastener of the plurality of snap-fit fasteners; and The base of the plurality of snap-fit fasteners further comprises a first wing portion and a second wing portion opposite the first wing portion; and each of the plurality of receivers comprise a crest having a tangent line and cross-section width that widens between the crest the first catch receiving surface; wherein the cantilever deforming surface of each of the plurality of receivers pushes the first cantilever and the second cantilever away from each other until the catch flange of the first cantilever snaps over and settles adjacent to the first catch receiving surface of the snap-fit receiver; and wherein at least part of the first wing portion and the second wing portion are disposed beneath the carrier facing surface.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
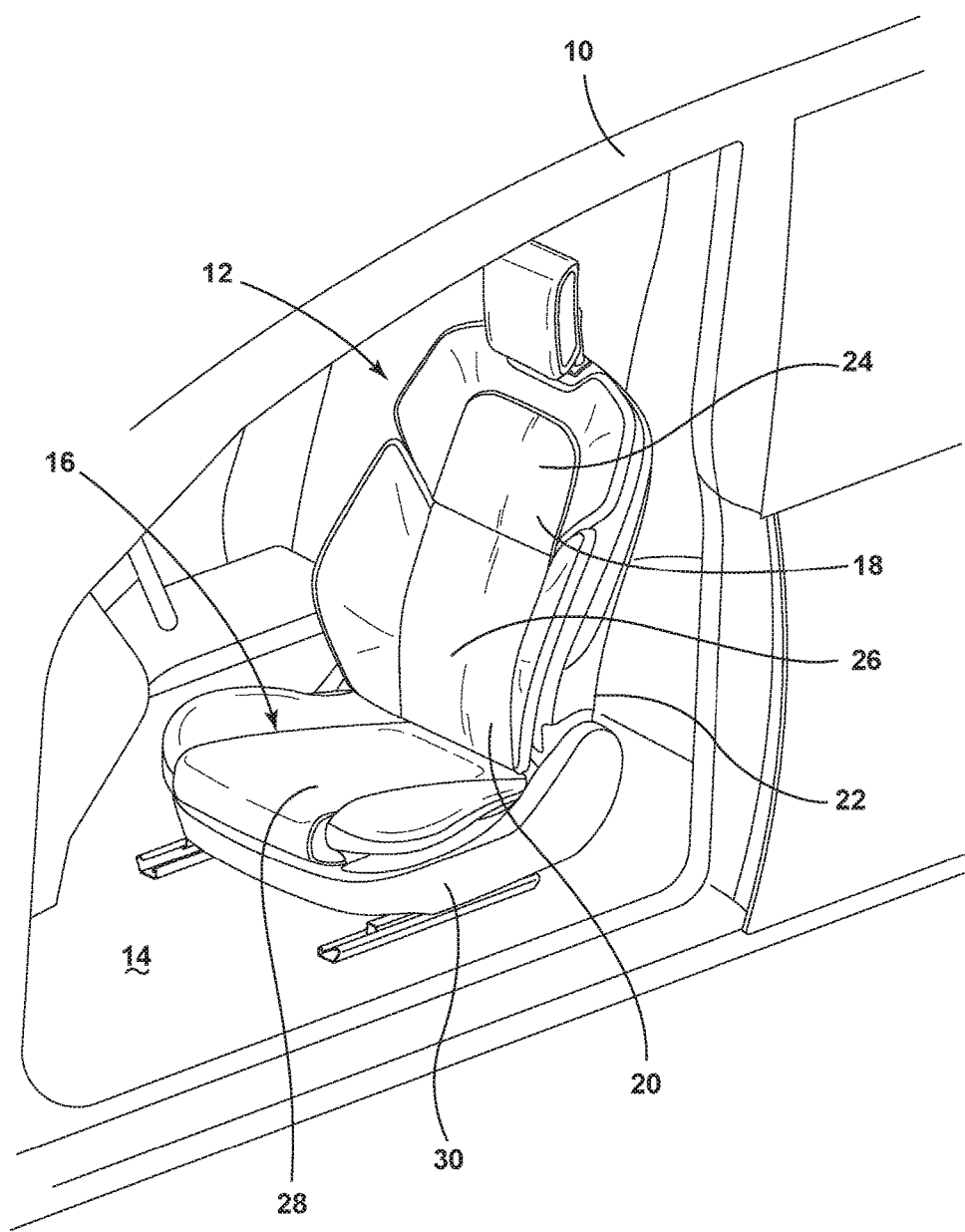
FIG. 1 is a perspective view of an interior of a vehicle illustrating a seating assembly.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, the interior of a vehicle 10 is illustrated. The vehicle 10 includes a seating assembly 12 interconnected with the floor 14. The seating assembly 12 includes a seat 16 and a seatback 18. The seatback 18 is generally adjustable relative to the seat 16. The seat 16 is generally adjustable relative to the floor 14. The seatback 18 is configured to support the back of an occupant of the seating assembly 12. The seatback 18 includes, among other things, a seatback comfort assembly 20 and a back panel 22. The seatback comfort assembly 20 can be divided into an upper thoracic region 24 and a lower lumbar region 26. The seat 16 includes a seat comfort assembly 28 attached to a seat frame 30. The vehicle 10 can be a car, truck, or van, among other things.

Figure 2:
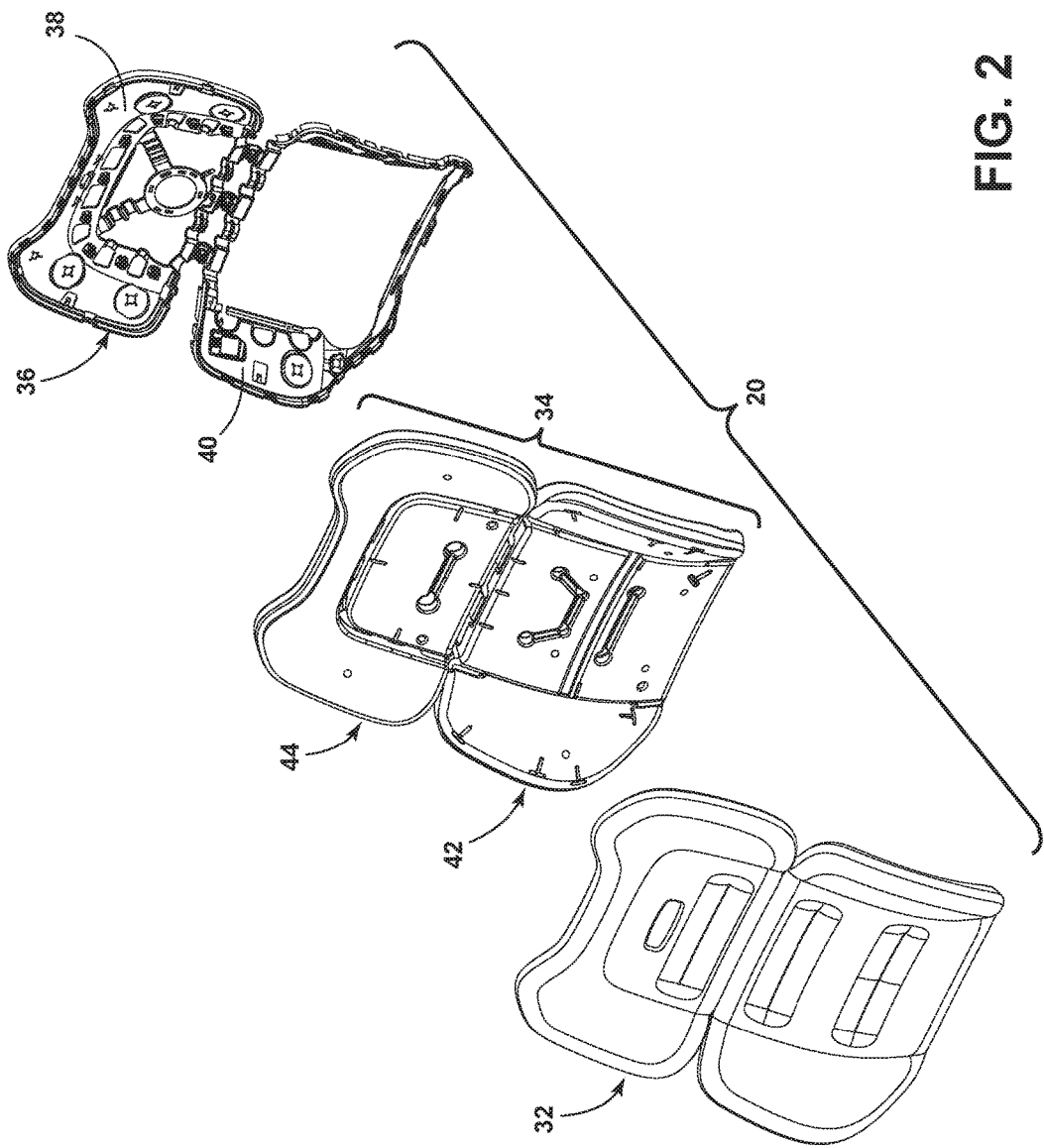
FIG. 2 is a perspective exploded view of a seatback comfort assembly for the seating assembly of FIG. 1, illustrating a cushion assembly attached to a carrier.
Figure 3:
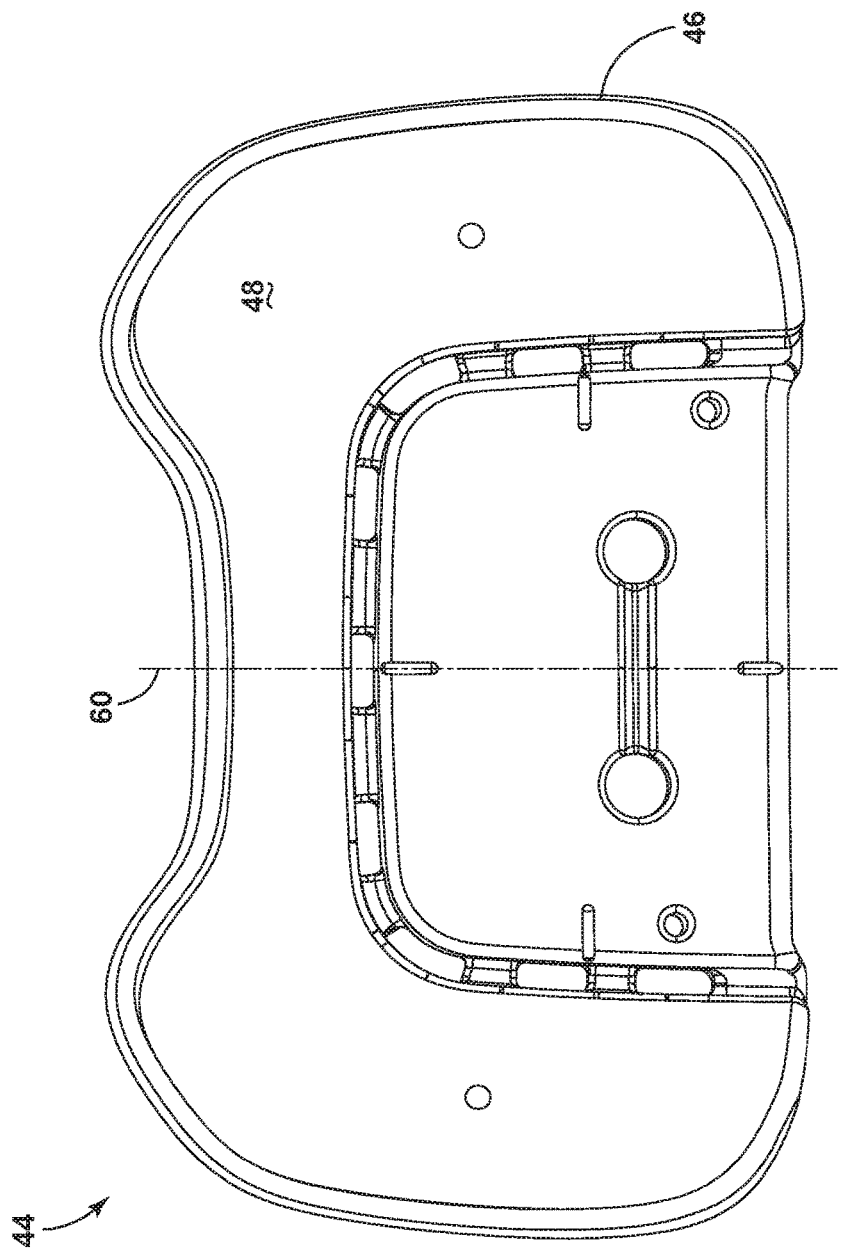
FIG. 3 is a front view of an upper thoracic component of the cushion assembly of FIG. 2, illustrating an occupant facing surface.
Figure 4:
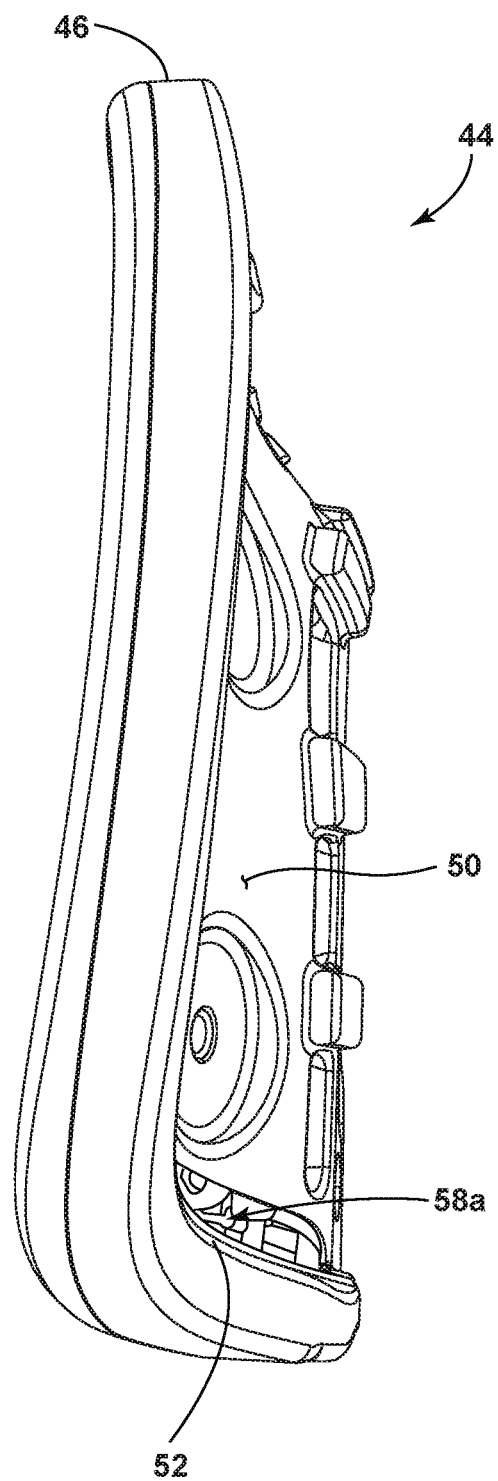
FIG. 4 is a side view of the upper thoracic component of FIG. 3, illustrating a lip that at least partially surrounds an upper thoracic section of the carrier, when the upper thoracic component is attached to the carrier.
Figure 5:
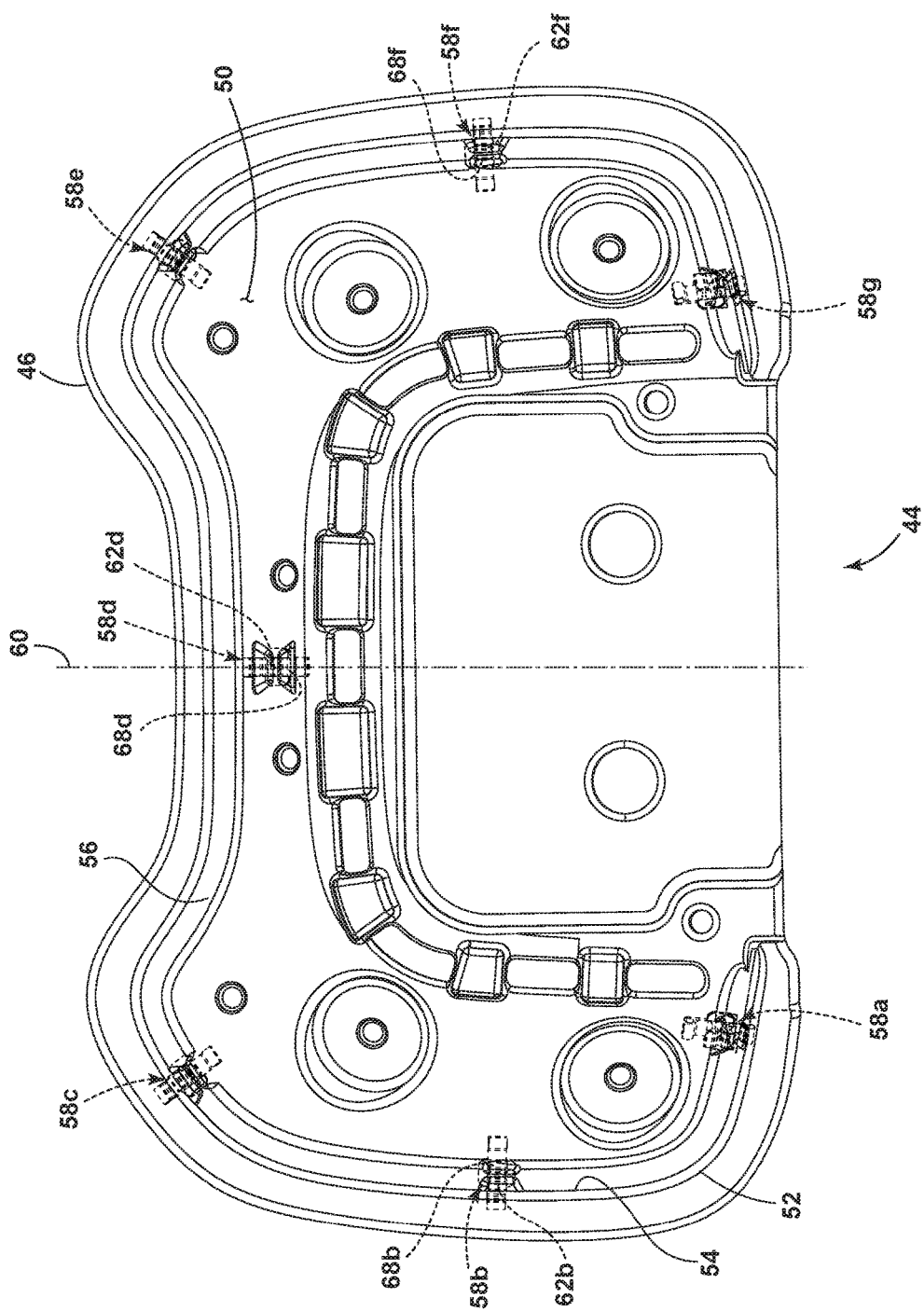
FIG. 5 is a rear view of the upper thoracic component of FIG. 3, illustrating a plurality of snap-fit fasteners arranged to connect the upper thoracic component to the carrier.
Figure 6:
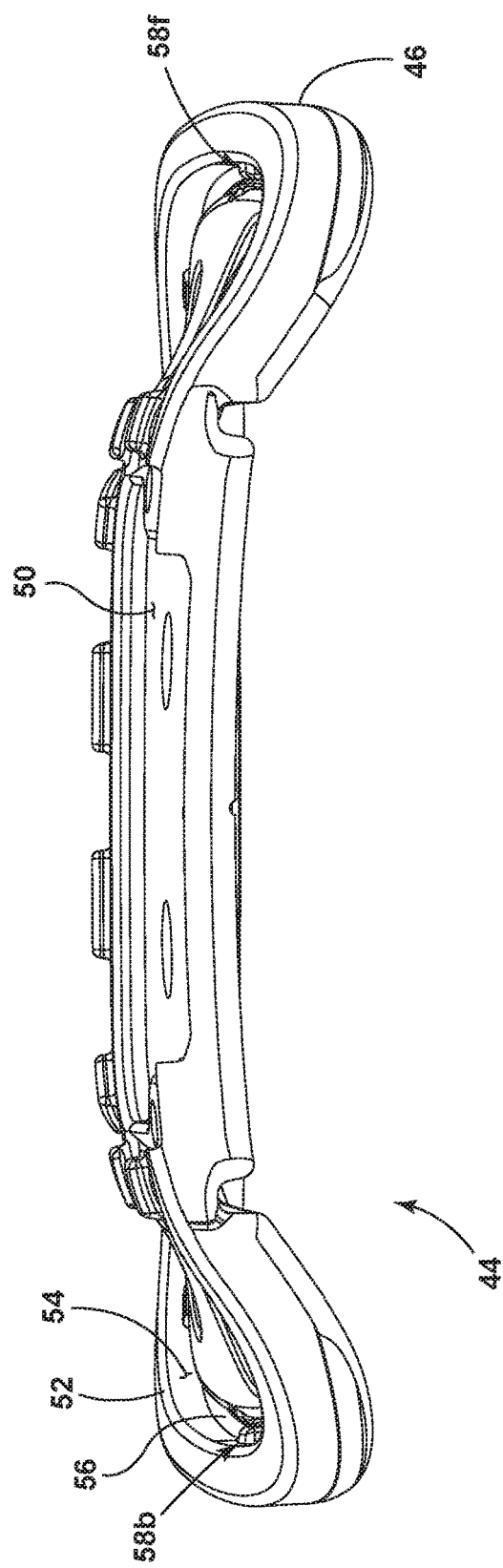
FIG. 6 is a bottom view of the upper thoracic component of FIG. 3, illustrating a recess adjacent the lip and at least of portion of the plurality of snap-fit fasteners arranged adjacent the lip.

Referring to FIG. 2, the seatback comfort assembly 20 includes a coverstock 32, a cushion assembly 34, and a carrier 36. The coverstock 32 is a fabric such as cloth, vinyl, or leather and provides the surface upon which the occupant sits. The coverstock 32 is attached to the carrier 36 and covers the cushion assembly 34. The carrier 36 provides structural support for the cushion assembly 34 and the coverstock 32. The carrier 36 has an upper thoracic section 38, which corresponds to the upper thoracic region 24 of the seatback comfort assembly 20, and a lower lumbar section 40, which corresponds to the lower lumbar region 26 of the seatback comfort assembly 20. The cushion assembly 34 includes a lower lumbar component 42, which corresponds to the lower lumbar region 26 of the seatback comfort assembly 20, and an upper thoracic component 44, which corresponds to the upper thoracic region 24 of the seatback comfort assembly 20. It should be understood, however, that the cushion assembly 34 can be one component rather than two separate components. The cushion assembly 34 is primarily molded foam. The cushion assembly 34 cushions the body of an occupant of the seating assembly 12. Although not illustrated, it should be understood that the seat comfort assembly 28 likewise includes a coverstock covering a cushion, which is attached to a carrier, which is further supported by the seat frame 30.

Referring to FIGS. 3-6, the upper thoracic component 44 of the cushion assembly 34 includes an outer edge 46 around the entire upper thoracic component 44. The upper thoracic component 44 further includes an occupant facing surface 48, which is the side of the upper thoracic component 44 that supports and faces an occupant sitting in the seating assembly 12. The upper thoracic component 44 further includes a carrier facing surface 50 opposite the occupant facing surface 48. The carrier facing surface 50 is the side of the upper thoracic component 44 that generally faces and abuts the carrier 36, when the upper thoracic component 44 is attached to the carrier 36. The upper thoracic component 44 further includes a lip 52 along the outer edge 46. The lip 52 extends generally rearward, that is, away from the occupant facing surface 48. The lip 52 is configured to at least partially surround the outer edge surface (discussed below) of the carrier 36, and thus help maintain the upper thoracic component 44 in place on the carrier 36 after attachment. In some embodiments of a cushion, a lip could be configured to entirely surround the outer edge surface of the carrier 36. The lip 52 includes an inward facing surface 54. The upper thoracic component 44 further includes a recess 56 in the carrier facing surface 50. The recess 56 runs parallel to the lip 52 and is adjacent to the lip 52. The recess 56 is contiguous with the inward facing surface 54 of the lip 52. In other words, the recess 56 transitions into the inward facing surface 54 of the lip 52. The recess 56 matches and receives a rib on the carrier 36, as discussed below, which further helps maintain the upper thoracic component 44 in place on the carrier 36 after attachment.

The upper thoracic component 44 includes a plurality of snap-fit fasteners 58a-g, including a first snap-fit fastener 58a, a second snap-fit fastener 58b, a third snap-fit fastener 58c, a fourth snap-fit fastener 58d, a fifth snap-fit fastener 58e, a sixth snap-fit fastener 58f, and a seventh snap-fit fastener 58g. The plurality of snap-fit fasteners 58a-g are arranged to interconnect with (e.g., fasten or attach to) a plurality of snap-fit receivers (discussed below) on the carrier 36. The plurality of snap-fit fasteners 58a-g are accessible for interconnection from the carrier facing surface 50. In other words, the plurality of snap-fit fasteners 58a-g are accessible from the rear of the upper thoracic component 44. Thus, the plurality of snap-fit fasteners 58a-g allow the carrier facing surface 50 to face and abut the carrier 36.

The snap-fit fasteners 58a-g are arranged so as to prevent the outer edge 46 from rolling up after the upper thoracic component 44 cushion is attached to the carrier 36. To prevent the outer edge 46 from rolling up, the snap-fit fasteners 58a-g are provided close to the outer edge 46 and numerous snap-fit fasteners 58a-g are utilized. In this embodiment of the upper thoracic component 44 of the cushion assembly 34, seven spaced apart snap-fit fasteners 58a-g are utilized. One snap-fit fastener, snap-fit fastener 58d, is located at a midline 60 of the upper thoracic component 44. Three snap-fit fasteners, snap-fit fasteners 58a-c, are located to one side of the midline 60. Three snap-fit fasteners, snap-fit fasteners 58e-g, are located to the other side of the midline 60. A portion of the snap-fit fasteners 58a-g, snap-fit fasteners 58a-c and 58e-g, in this embodiment, are accessible for interconnection with the carrier 36 adjacent the lip 52. Because the lip 52 surrounds the carrier 36, the snap-fit fasteners 58a-c, 58e-g are positioned adjacent (close to) the lip 52 as close to the outer edge 46 as possible, which assists in preventing the outer edge 46 from rolling up. At least some of the plurality of snap-fit fasteners 58a-g, specifically snap-fit fasteners 58a-c, 58e-g, are arranged adjacent the recess 56 such that the base (discussed below) of the snap-fit fastener is disposed within the foam directly below the surface of the recess 56.

Figure 7:
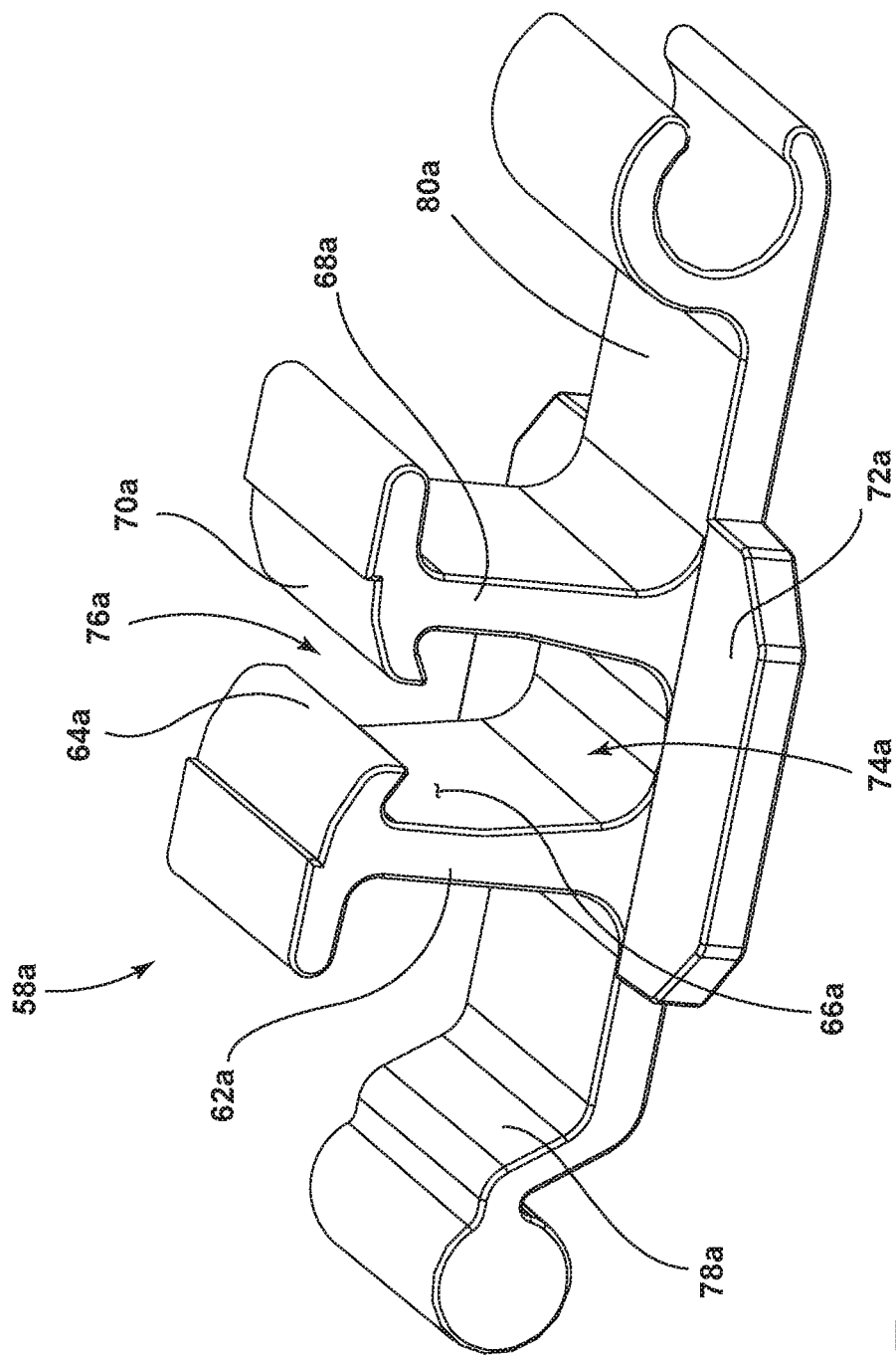
FIG. 7 is a perspective view of a representative snap-fit fastener of the plurality of snap-fit fasteners of FIG. 5, illustrating a first cantilever opposing a second cantilever.
Figure 8:
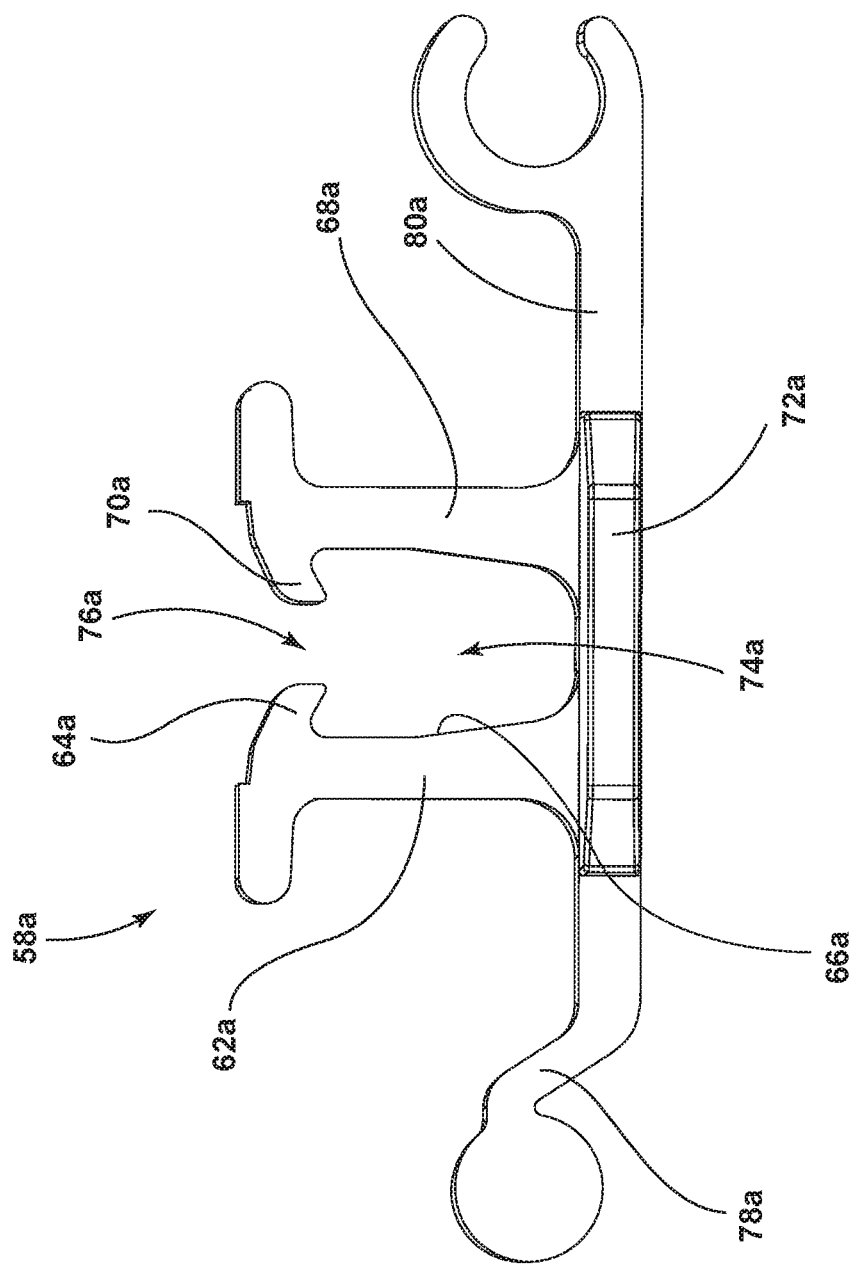
FIG. 8 is a side view of the representative snap-fit fastener of the plurality of snap-fit fasteners of FIG. 5, illustrating an opening into a receiver channel.
Figure 9:
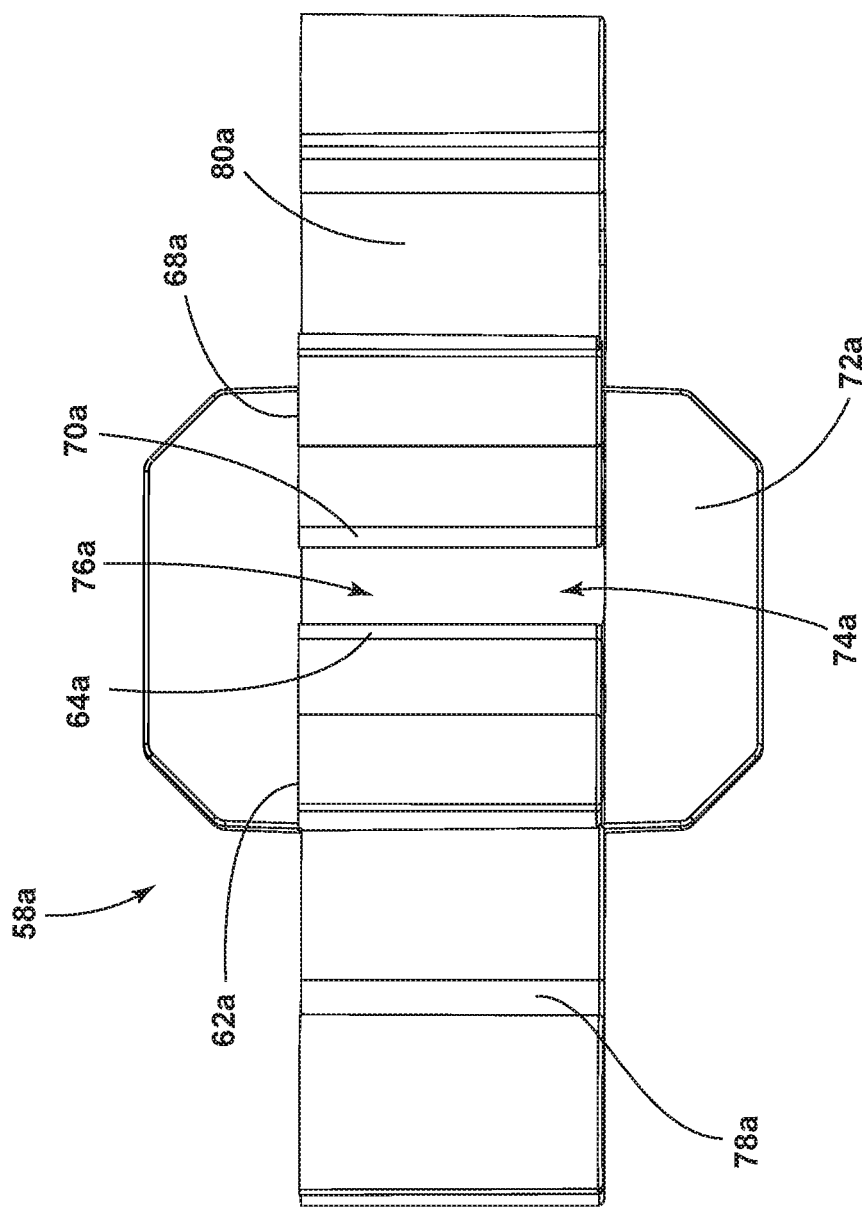
FIG. 9 is a top view of the representative snap-fit fastener of the plurality of snap-fit fasteners of FIG. 5.

Referring now to FIGS. 7-9, the structure of each of the plurality of snap-fit fasteners 58a-g is discussed. As each of the plurality of snap-fit fasteners 58a-g is the same, snap-fit fastener 58a is discussed as representative of all of the plurality of snap-fit fasteners 58a-g. Snap-fit fastener 58a includes a first cantilever 62a, which includes a catch flange 64a. As discussed further below, the first cantilever 62a deforms while the catch flange 64a slides over a surface of a snap-fit receiver on the carrier 36 and then snaps back to the original (non-deformed) state when the catch flange 64a meets an undercut or recessed area of the snap-fit receiver, which then holds the catch flange 64a into place, thereby interconnecting the snap-fit fastener 58a to the snap-fit receiver. The first cantilever 62a includes a receiver facing surface 66a. The receiver facing surface 66a is generally parallel to the portion of the outer edge 46 of the upper thoracic component 44 cushion to which the receiver facing surface 66a is closest.

Representative snap-fit fastener 58a further includes a second cantilever 68a. A cushion, such as the upper thoracic component 44, can interconnect with a structural support, such as carrier 36, and prevent the outer edge, such as outer edge 46, from rolling up by utilizing snap-fit fasteners that include only a first cantilever, such as first cantilever 62a. However, adding a second cantilever, such as second cantilever 68a, adds stability to the interconnection. The second cantilever 68a can be generally parallel to the first cantilever 62a, in that the first cantilever 62a and the second cantilever 68a both extend from a base 72a (discussed below) in the same direction. The second cantilever 68a also includes a catch flange 70a. The catch flange 70a of the second cantilever 68a serves the same function as the catch flange 64a of the first cantilever 62a in that the catch flange 70a meets an undercut or recessed area of the snap-fit receiver and is thereby held in place. The catch flange 70a of the second cantilever 68a extends toward the first cantilever 62a and the catch flange 64a of the first cantilever 62a extends toward the second cantilever 68a. In this manner, the first cantilever 62a and the second cantilever 68a are mirror images of each other.

Representative snap-fit fastener 58a further includes a base 72a that is perpendicular to and supports the first cantilever 62a and the second cantilever 68a. The base 72a, the first cantilever 62a, and the second cantilever 68a form a receiver channel 74a, within which a snap-fit receiver 84a (discussed below) of the carrier 36 can be held and maintained allowing for interconnection between the snap-fit fastener 58a and the snap-fit receiver 84a. The space between the catch flange 64a of the first cantilever 62a and the catch flange 70a of the second cantilever 68a forms an opening 76a into the receiver channel 74a. The base 72a further includes a first wing portion 78a and a second wing portion 80a opposite of the first wing portion 78a. At least the first wing portion 78a and the second wing portion 80a are disposed beneath the carrier facing surface 50. This can be achieved by foam molding the cushion, here the upper thoracic component 44, with the snap-fit fastener 58a properly positioned within the mold during the molding of the foam (along with all the other snap-fit fasteners 58b-g), such that the first wing portion 78a and the second wing portion 80a are molded over. The first wing portion 78a and the second wing portion 80a add stability and keep the snap-fit fastener 58a connected to the upper thoracic component 44 even when a pulling force is applied to the first cantilever 62a and the second cantilever 68a. The first cantilever 62a and the second cantilever 68a may be nearly entirely exposed (i.e., not molded over with foam) and extend away from the carrier facing surface 50 in a generally rearward direction. The first cantilever 62a and the second cantilever 68a may be partially molded over with foam, such that most of the first cantilever 62a and the second cantilever 68a are molded over with foam except for the receiver facing surface 66a of the first cantilever 62a, the equivalent receiver facing surface of the second cantilever 68a, all or most of the receiver channel 74a, and the portion of the catch flange 64a and the catch flange 70a facing downward toward the receiver channel 74a.

Figure 10:
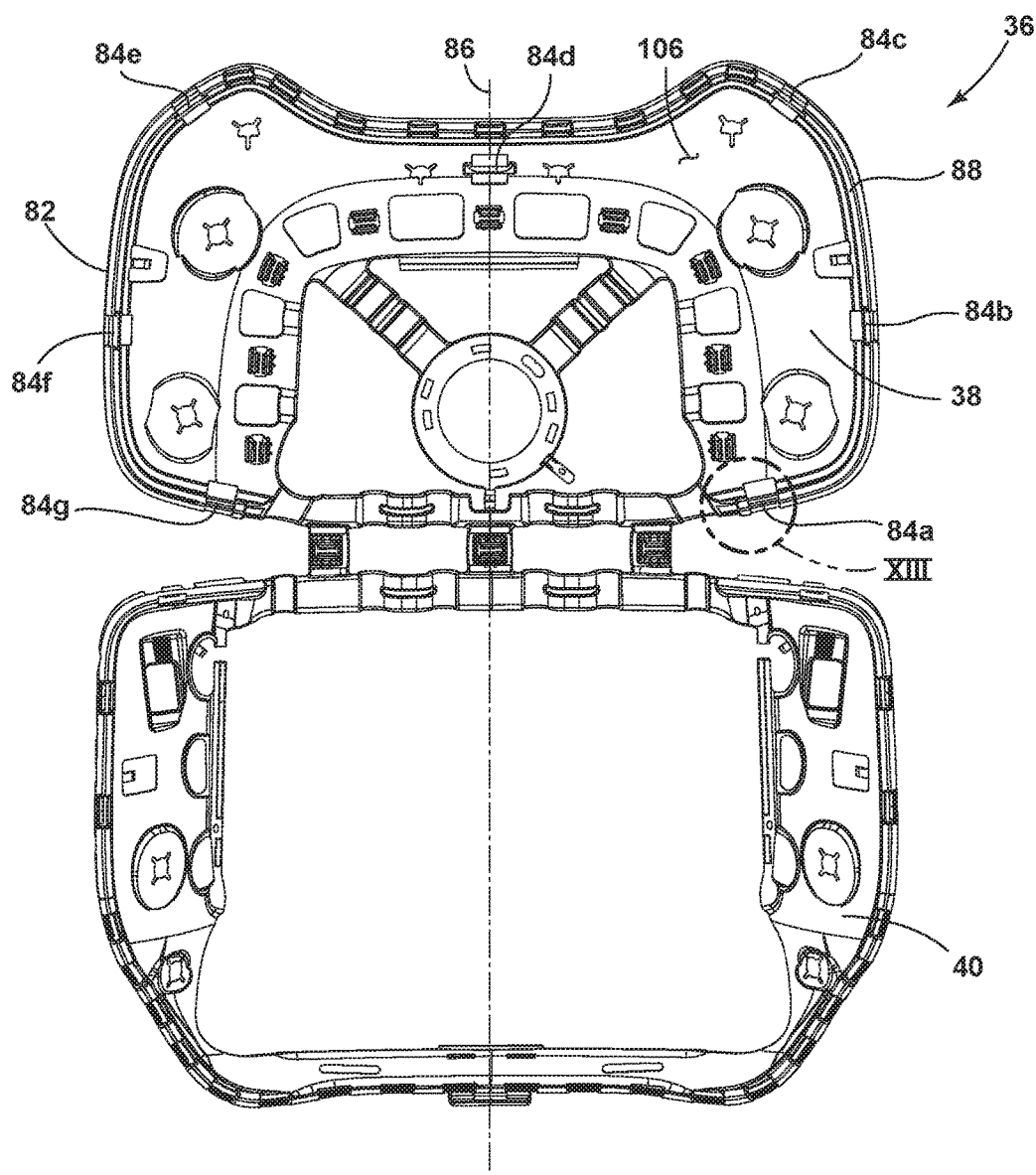
FIG. 10 is a front view of the carrier of FIG. 2, illustrating a plurality of snap-fit receivers arranged near an outer edge surface of the upper thoracic section.
Figure 11:
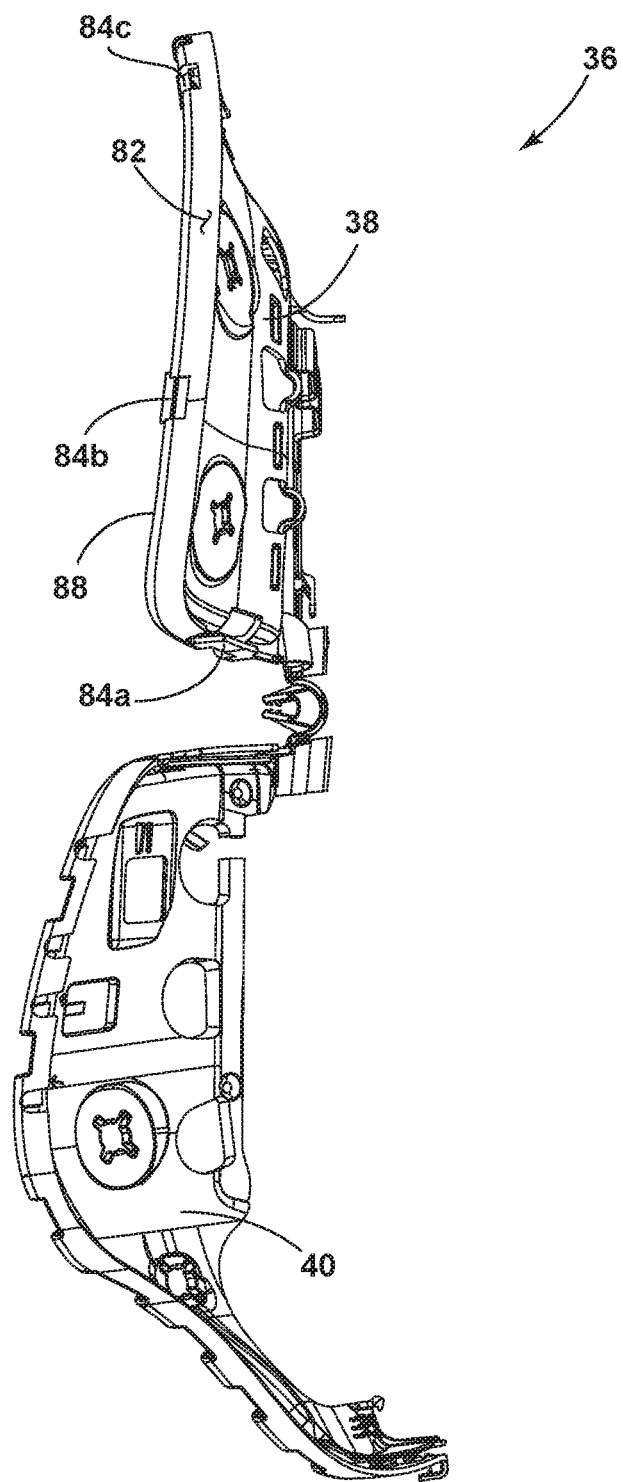
FIG. 11 is a side view of the carrier of FIG. 2, illustrating the plurality of snap-fit receivers arranged near the outer edge surface of the upper thoracic section.
Figure 12:
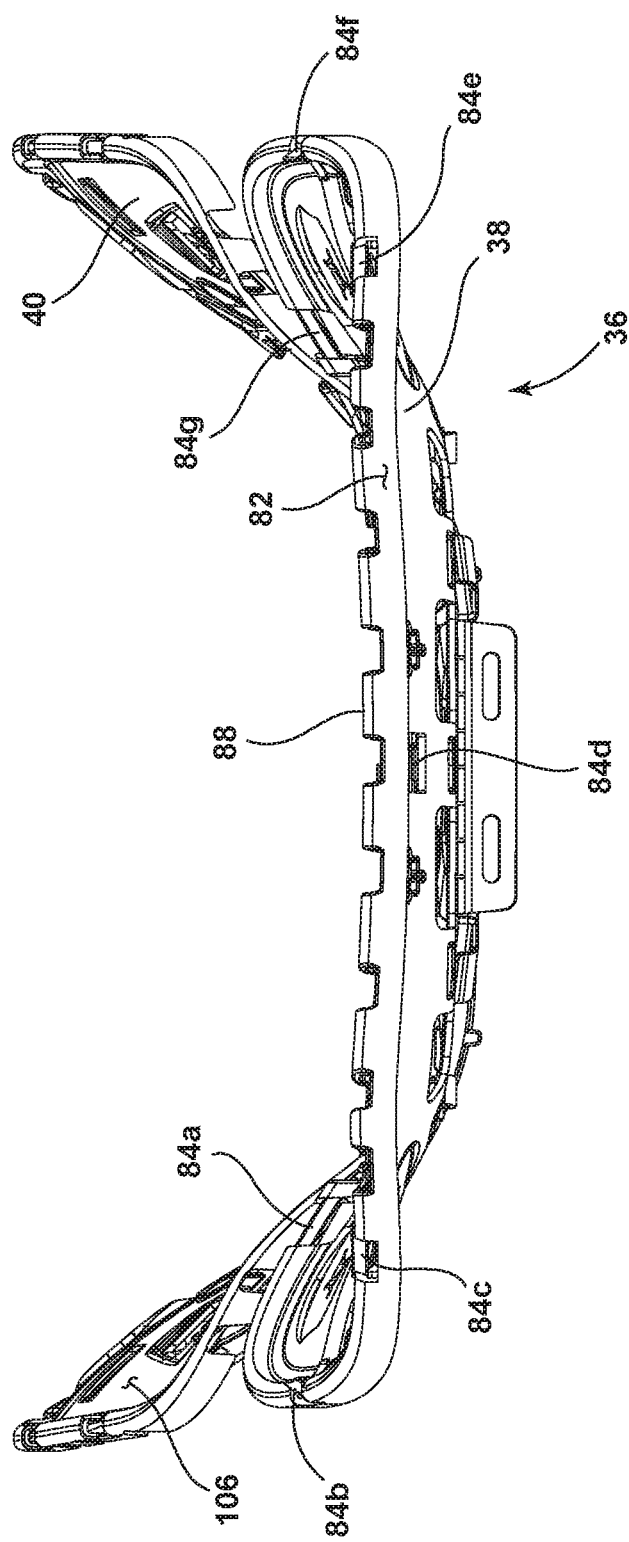
FIG. 12 is a top view of the carrier of FIG. 2, illustrating the plurality of snap-fit receivers arranged near the outer edge surface of the upper thoracic section.

Referring now to FIGS. 10-12, the carrier 36 includes an outer edge surface 82. The carrier 36 further includes a plurality of snap-fit receivers 84a-g near the outer edge surface 82. The plurality of snap-fit receivers 84a-g include a first snap-fit receiver 84a, a second snap-fit receiver 84b, a third snap-fit receiver 84c, a fourth snap-fit receiver 84d, a fifth snap-fit receiver 84e, a sixth snap-fit receiver 84f, and a seventh snap-fit receiver 84g. The plurality of snap-fit receivers 84a-g are arranged to receive the plurality of snap-fit fasteners 58a-g on the upper thoracic component 44 of the cushion assembly 34. In other words, the plurality of snap-fit receivers 84a-g are positioned to interconnect with the plurality of snap-fit fasteners 58a-g. For example, first snap-fit receiver 84a is positioned to interconnect with first snap-fit fastener 58a, and so on. Positioning the snap-fit receivers 84a-g near the outer edge surface 82 helps prevent the upper thoracic component 44 cushion from rolling up when the upper thoracic component 44 is attached to the carrier 36. The carrier 36 has a midline 86.

In this embodiment of the carrier 36, at least one of the plurality of snap-fit receivers 84a-g, namely snap-fit receiver 84d, is located at the midline 86. Further, at least three of the plurality of snap-fit receivers 84a-g, namely snap-fit receivers 84a-c, are located to one side of the midline 86. Likewise, at least three of the plurality of snap-fit receivers 84a-g, namely snap-fit receivers 84e-g, are located to the other side of the midline 86. Such an arrangement provides appropriate distribution of the plurality of snap-fit receivers 84a-g for adequate interconnection between the carrier 36 and the upper thoracic component 44 cushion.

The carrier 36 further includes a rib 88 and a cushion facing surface 106. The cushion facing surface 106, at the upper thoracic section 38, faces and abuts the carrier facing surface 50 of the upper thoracic component 44. The rib 88 projects generally forward, that is, out perpendicularly relative to the cushion facing surface 106. The rib 88 is contiguous with the outer edge surface 82. In other words, the outermost surface of the rib 88 is the outer edge surface 82. As mentioned above, the recess 56 of the upper thoracic component 44 matches and receives the rib 88. The recess 56 is the recess in which the rib 88 sits. That further helps maintain the upper thoracic component 44 in place on the upper thoracic section 38 of the carrier 36, when the upper thoracic component 44 is attached to the carrier 36. The first cantilever 62a-c, 62e-g and the second cantilever 68a-c, 68e-g of snap-fit fasteners 58a-c, 58e-g are positioned such that they are within the recess 56, slightly projected from the recess 56, and form the receiver channels 74a-c, 74e-g that are within the recess. Snap-fit receivers 84a-c, 84e-g, are contiguous with the rib 88 (i.e., they are arranged along the rib 88). Thus, not only do the recess 56 and the rib 88 mechanically cooperate, the snap-fit fasteners 58a-c, 58e-g located along the recess 56 interconnect with the snap-fit receivers 84a-c, 84e-g on the rib 88.

Figure 13:
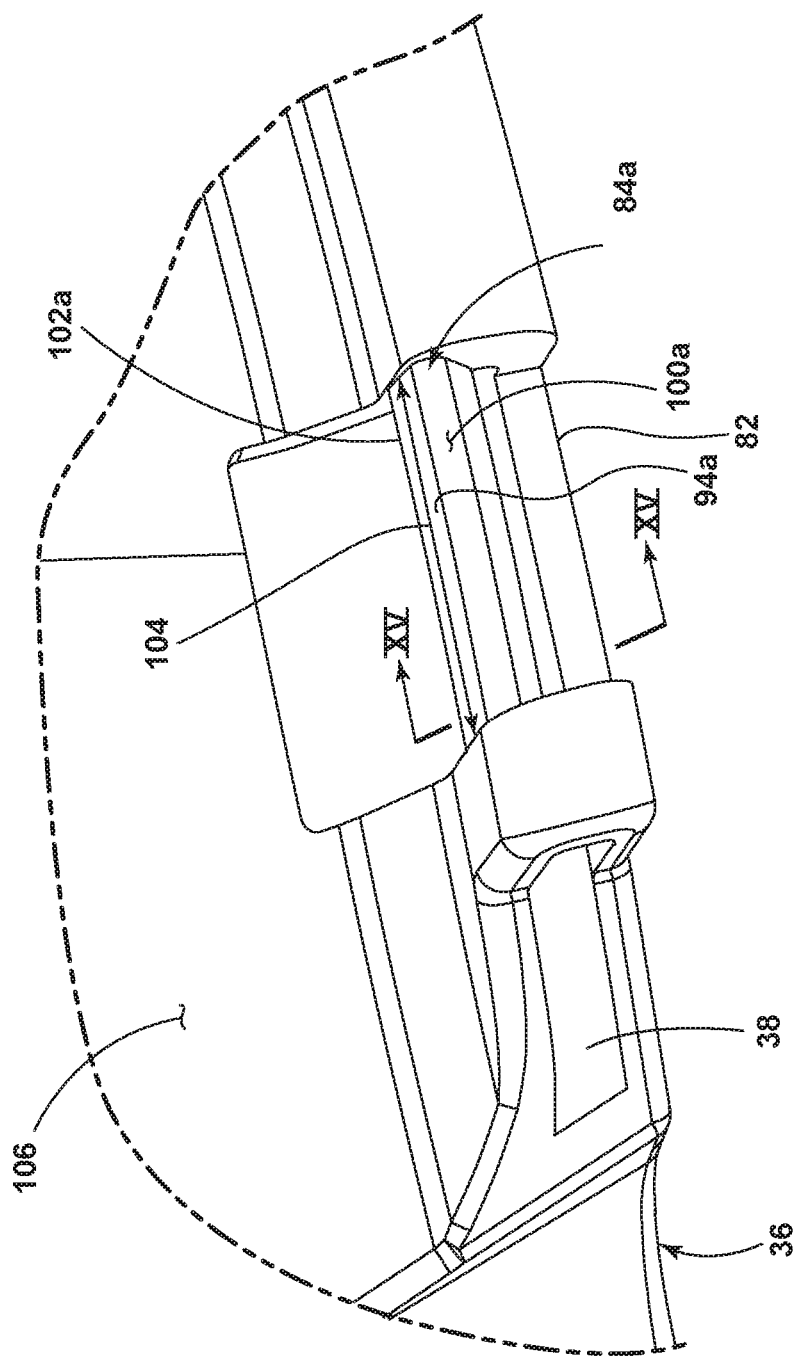
FIG. 13 is front close up view of area XIII of FIG. 10, illustrating a representative snap-fit receiver in the form of an elongated beam with a crest.
Figure 14:
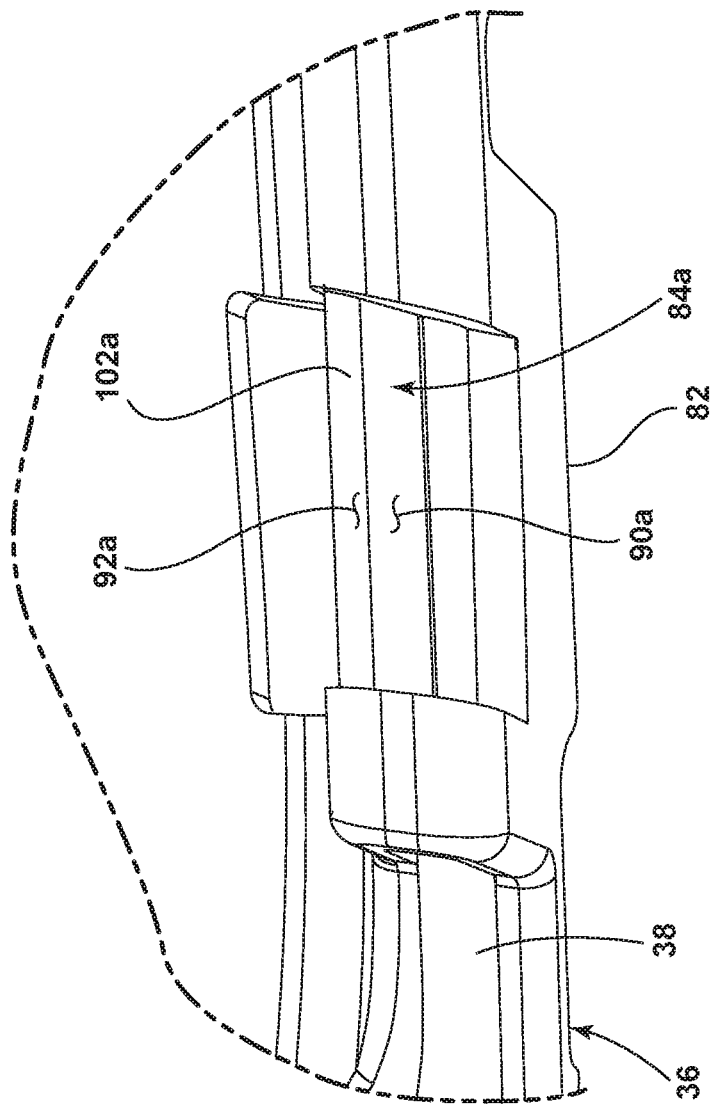
FIG. 14 is a rear close up view of area XIII of FIG. 10, illustrating the snap-fit receiver including a first catch receiving surface and a second catch receiving surface.
Figure 15:
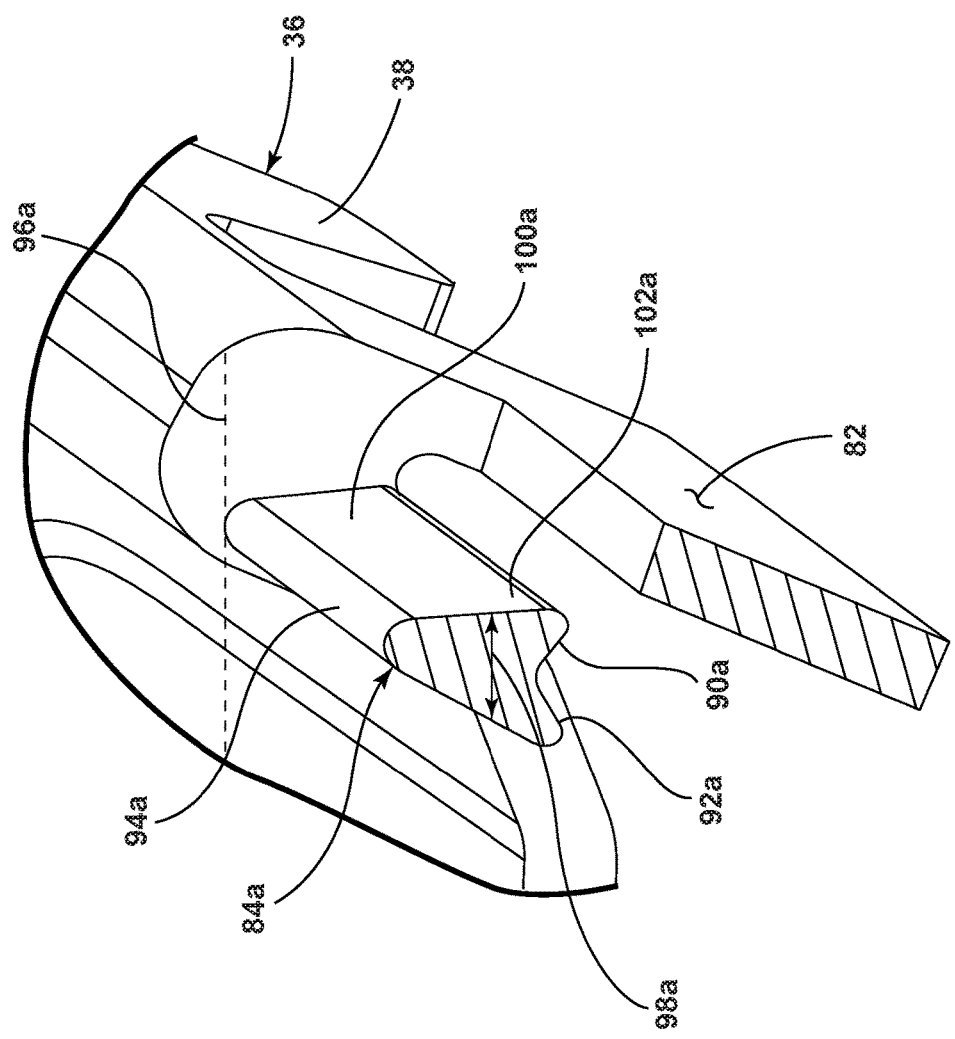
FIG. 15 is a perspective cross-sectional view taken through line XV-XV of FIG. 13, illustrating the snap-fit receiver with widening cross section from the crest to the first catch receiving surface.
Figure 16:
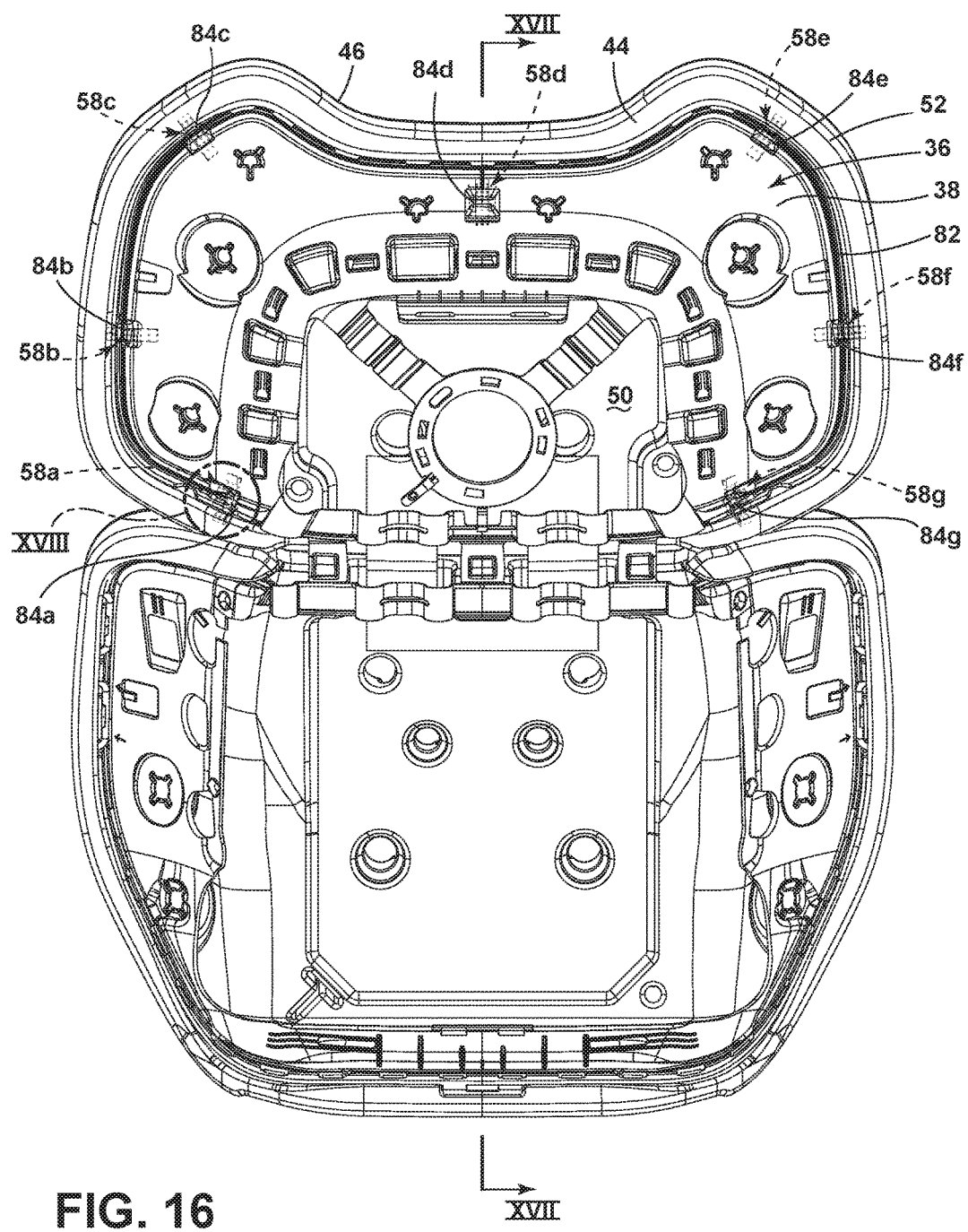
FIG. 16 is a rear view of the cushion assembly and the carrier of FIG. 2 attached to each other, illustrating the plurality of snap-fit fasteners interconnected with the plurality of snap-fit receivers.
Figure 17:
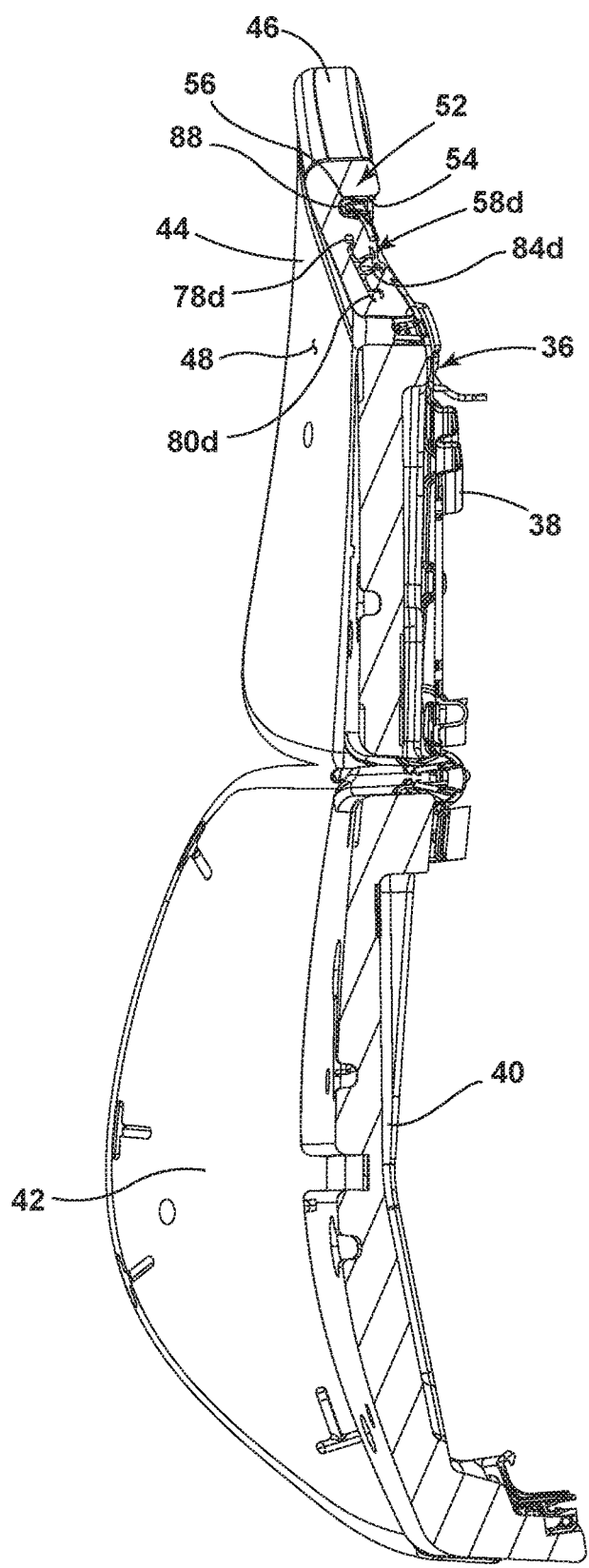
FIG. 17 is a cross-sectional view of the attached cushion assembly and carrier of FIG. 2 taken through line XVII-XVII of FIG. 16, illustrating the lip at least partially surrounding a rib of the carrier.
Figure 18:
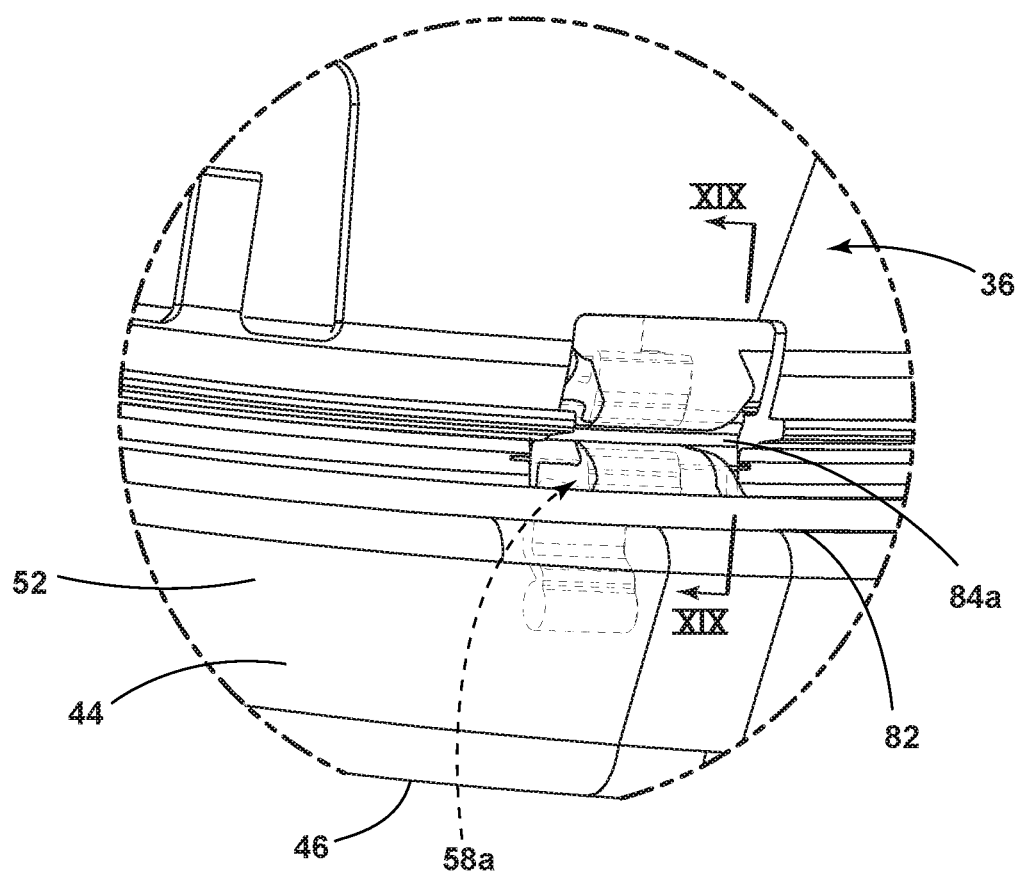
FIG. 18 is a rear close up view of area XVIII of FIG. 16, illustrating the snap-fit fastener of FIG. 7 interconnected with the snap-fit receiver of FIG. 13.
Figure 19:
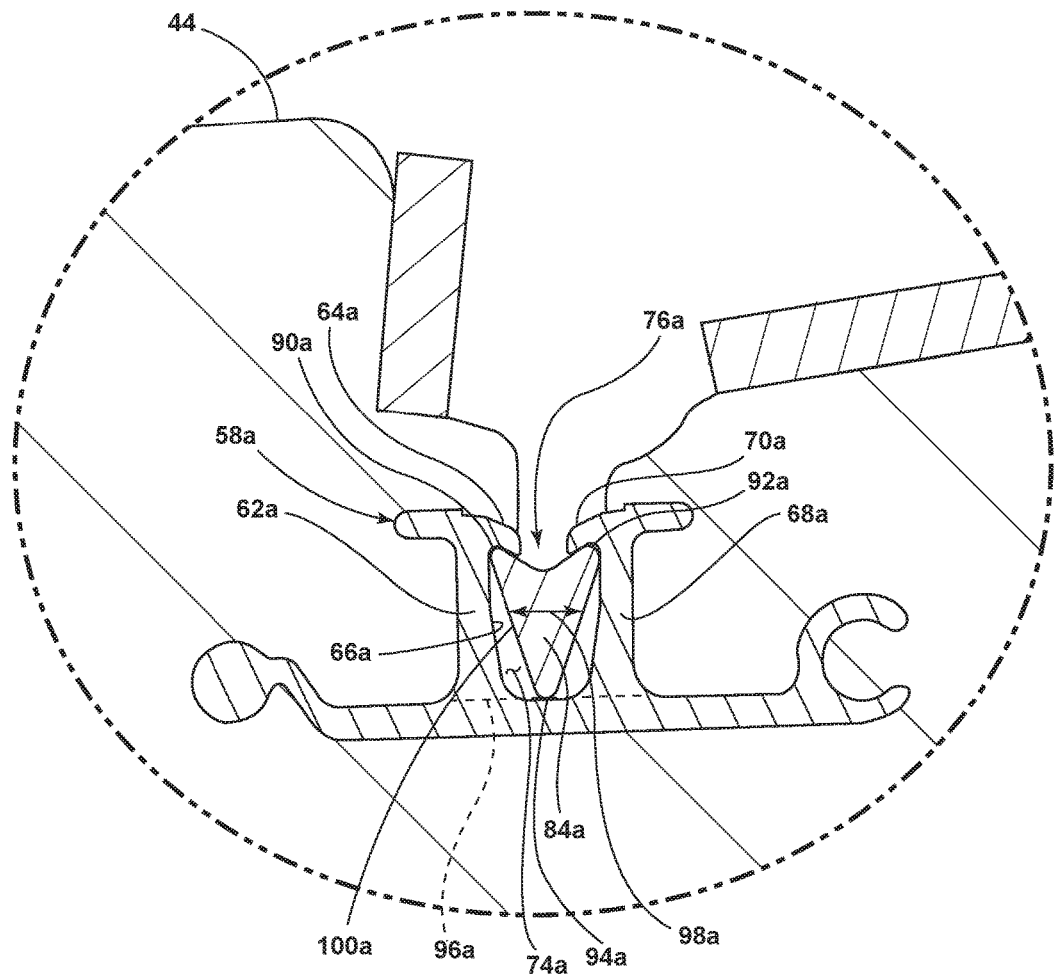
FIG. 19 is a perspective cross-sectional view taken through line XIX-XIX of FIG. 18, illustrating the snap-fit receiver of FIG. 13 held within the receiver channel of the snap-fit fastener of FIG. 7.

Referring now to FIGS. 13-15, each of the plurality of snap-fit receivers 84a-g are discussed. As each of the plurality of snap-fit receivers 84a-g include the same general features, snap-fit receiver 84a is discussed as representative of all snap-fit receivers 84a-g. Snap-fit receiver 84a includes a first catch receiving surface 90a. The first catch receiving surface 90a is adjacent the first catch flange 64a extending from the first cantilever 62a of snap-fit fastener 58a, when the upper thoracic component 44 cushion interconnects with the carrier 36. The first catch receiving surface 90a and the first catch flange 64a cooperate to prevent the snap-fit receiver 84a from disconnecting from the snap-fit fastener 58a after they become interconnected. Snap-fit receiver 84a can further include a second catch receiving surface 92a. The second catch receiving surface 92a is adjacent the catch flange 70a extending from the second cantilever 68a of the snap-fit fastener 58a when the upper thoracic component 44 interconnects with carrier 36. The second catch receiving surface 92a and the second catch flange 70a cooperate to prevent the snap-fit receiver 84a from disconnecting from the snap-fit fastener 58a after they become interconnected. Although the snap-fit receiver 84a could employ only the first catch receiving surface 90a if snap-fit fastener 58a includes only the first cantilever 62a with catch flange 64a, as discussed above, it could be advantageous to include the opposing second cantilever 68a with catch flange 70a. In such as circumstance, the second catch receiving surface 92a would likewise be advantageous to interact with catch flange 70a of the second cantilever 68a.

Snap-fit receiver 84a further includes a crest 94a. As explained in greater detail below, snap-fit fastener 58a first interacts with snap-fit receiver 84a at the crest 94a as the crest 94a enters the receiver channel 74a. The crest 94a has a tangent line 96a. Snap-fit receiver 84a further comprises a cross-section width 98a that is parallel to the tangent line 96a. The cross-section width 98a widens between the crest 94a and the first catch receiving surface 90a. This widening cross-section width 98a, as explained in greater detail below, causes a cantilever deforming surface 100a to push the first cantilever 62a and the second cantilever 68a apart from each other as snap-fit receiver 84a goes through opening 76a and enters the receiver channel 74a.

Snap-fit receiver 84a can further include an elongated beam 102a. In other words, the cross-section of a snap-fit receiver 84a can have an entirely enclosed perimeter with no material impeding the shortest distance between the first catch receiving surface 90a and the second catch receiving surface 92a. In short, snap-fit receiver 84a can be circumnavigable around the cross-section thereof. The elongated beam 102a has a length 104a. The length 104a is generally parallel to the portion of the outer edge surface 82 to which the length 104a is closest.

Referring now to FIGS. 16-19, the upper thoracic component 44 cushion becomes interconnected with the upper thoracic section 38 of the carrier 36 by placing the carrier facing surface 50 of the upper thoracic component 44 onto the cushion facing surface 106 of the upper thoracic section 38 of the carrier 36. The crest 94a of snap-fit receiver 84a is moved toward and into the opening 76a between the catch flange 64a of the first cantilever 62a and the catch flange 70a of the second cantilever 68a of snap-fit fastener 58a. The cantilever deforming surface 100a of snap-fit receiver 84a increasingly deforms the first cantilever 62a and/or the second cantilever 68a as the cantilever deforming surface 100a progresses through the opening 76a and into the receiver channel 74a, because the cross-section width 98a parallel to the tangent line 96a of the crest 94a widens toward the first catch receiving surface 90a. The cantilever deforming surface 100a continues to deform the first cantilever 62a and/or the second cantilever 68a, and pushes them away from each other, until the catch flange 64a of the first cantilever 62a and the catch flange 70a of the second cantilever 68a snap over and settle adjacent to the first catch receiving surface 90a and second catch receiving surface 92a, respectively, of the snap-fit receiver 84a. This snapping provides audible and tactile feedback that snap-fit fastener 58a and the snap-fit receiver 84a have interconnected. The receiver facing surface 66a of the first cantilever 62a of snap-fit fastener 58a faces the cantilever deforming surface 100a of snap-fit receiver 84a. Snap-fit receiver 84a is now disposed within the receiver channel 74a of snap-fit fastener 58a. The remaining of the plurality of snap-fasteners 58b-g and plurality of snap-fit receivers 84b-g are interconnected in the same manner, providing the same audible and tactile feedback when they become interconnected.

Accordingly, the plurality of snap-fit receivers 84a-g have received, are retaining, and are interconnected with the plurality of snap-fit fasteners 58a-g. Thus, the upper thoracic component 44 of the cushion assembly 34 is interconnected with the upper thoracic section 38 of the carrier 36. The carrier facing surface 50 of the upper thoracic component 44 thus faces and abuts the cushion facing surface 106 of the upper thoracic section 38 of the carrier 36. The plurality of snap-fit fasteners 58a-g are interconnected with the plurality of snap-fit receivers 84a-g from the carrier facing surface 50. More specifically, the first snap-fit receiver 84a has received and is retaining the first snap-fit fastener 58a, the second snap-fit receiver 84b has received and is retaining the second snap-fit fastener 58b, the third snap-fit receiver 84c has received and is retaining the third snap-fit fastener 58c, the fourth snap-fit receiver 84d has received and is retaining the fourth snap-fit fastener 58d, the fifth snap-fit receiver 84e has received and is retaining the fifth snap-fit fastener 58e, the sixth snap-fit receiver 84f has received and is retaining the sixth snap-fit fastener 58f, and the seventh snap-fit receiver 84g has received and is retaining the seventh snap-fit fastener 58g. As the plurality of snap-fit receiver 84a-g are arranged close to the outer edge surface 82 and spaced apart, and there are plurality of snap-fit fasteners 58a-g arranged close to the outer edge 46 to accommodate the location of the plurality of snap-fit receiver 84a-g, the outer edge 46 of the upper thoracic component 44 cushion is prevented from rolling up.

The upper thoracic component 44 cushion at least partially surrounds carrier 36 such that at least a portion of the inward facing surface 54 of the lip 52 faces the outer edge surface 82 of the upper thoracic section 38 of the carrier 36. At least a portion of the snap-fit fasteners 58a-g, namely snap-fit fasteners 58a-c, 58e-g, are interconnected with a portion of the plurality of snap-fit receivers 84a-g, namely snap-fit receivers 84a-c, 84e-g, adjacent the lip 52. At least a portion of the rib 88 of the carrier 36 is seated within the recess 56 of the upper thoracic component 44 cushion. By partially encircling the upper thoracic section 38 of the carrier 36 in this manner, that is, using lip 52 to partially surround and encircle the outer edge surface 82 of upper thoracic section 38 and seating the rib 88 within the recess 56, the upper thoracic component 44 is more apt to stay on and interconnected with the carrier 36. By interconnecting snap-fit fasteners 58a-g and snap-fit receivers 84a-g adjacently, that is, close to, the lip 52, the outer edge 46 of the upper thoracic component 44 is less likely to roll up.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating assembly for a vehicle comprising:
  a cushion comprising an outer edge, an occupant facing surface, a carrier facing surface opposite the occupant facing surface, a plurality of snap-fit fasteners disposed at the carrier facing surface, a lip extending away from the occupant facing surface along the outer edge, and a recess into the carrier facing surface adjacent and parallel to the lip; and
  a carrier comprising an outer edge surface, a plurality of snap-fit receivers near the outer edge surface of the carrier cooperating with the plurality of snap-fit fasteners to interconnect the cushion and the carrier, and a rib contiguous with the outer edge surface that is seated within the recess of the cushion;
    each of the plurality of snap-fit fasteners comprising a first cantilever, the first cantilever including a catch flange and a receiver facing surface that faces one of the plurality of snap-fit receivers;
    each of the plurality of snap-fit receivers comprising a cantilever deforming surface and a first catch receiving surface, and at least a portion of the plurality of the snap-fit receivers are arranged along the rib; and
    the cantilever deforming surface deforms the first cantilever of each of the plurality of snap-fit fasteners while the plurality of snap-fit receivers receives the plurality of snap-fit fasteners until the catch flange snaps over and settles adjacent to the first catch receiving surface of the snap-fit receiver.

2. The seating assembly of claim 1,
  a portion of each of the plurality of snap-fit fasteners is disposed beneath the carrier facing surface of the cushion.

3. The seating assembly of claim 1,
at least some of the plurality of snap-fit fasteners are arranged adjacent the recess; and
at least some of the plurality of snap-fit receivers are arranged along the rib and interconnect with the at least some of the plurality of snap-fit fasteners.

4. The seating assembly of claim 1,
each of the plurality of snap-fit fasteners further including a second cantilever parallel to the first cantilever, and a base perpendicular to the first cantilever and the second cantilever;
the second cantilever including a catch flange extending toward the first cantilever;
the base, the first cantilever, and the second cantilever forming a receiver channel;
the catch flange of the first cantilever extends toward the second cantilever; and
each of the plurality of snap-fit receivers are disposed within the receiver channel of one of the snap-fit fasteners of the plurality of snap-fit fasteners.

5. The seating assembly of claim 4,
the base of each of the plurality of snap-fit fasteners further comprising a first wing portion and a second wing portion opposite the first wing portion, at least a portion of both the first wing portion and the second wing portion being disposed beneath the carrier facing surface;
each of the plurality of snap-fit receivers comprising a crest having a tangent line and a cross-section width that widens between the crest and the first catch receiving surface; and
the cantilever deforming surface of each of the plurality of snap-fit receivers pushes the first cantilever and the second cantilever away from each other until the catch flange of the first cantilever snaps over and settles adjacent to the first catch receiving surface of the snap-fit receiver.

6. The seating assembly of claim 1,
the cushion having a midline, an equal number of the plurality of snap-fit fasteners are disposed to each side of the midline, and one of the plurality of snap-fit fasteners is disposed at the midline; and
the carrier having a midline, an equal number of the plurality of snap-fit receivers are disposed to each side of the midline of the carrier, and one of the plurality of snap-fit receivers is disposed at the midline of the carrier.

\* \* \* \* \*